United States Patent [19]

Kueffer et al.

[11] Patent Number: 5,005,605
[45] Date of Patent: Apr. 9, 1991

[54] CONDITIONING VALVE

[75] Inventors: Max Kueffer, Blue Bell; Roy L. Feiss, Southampton, both of Pa.

[73] Assignee: Keystone International Holdings Corp., Wilmington, Del.

[21] Appl. No.: 377,426

[22] Filed: Jul. 10, 1989

[51] Int. Cl.⁵ ............................................. F16K 11/07
[52] U.S. Cl. ............................. 137/625.39; 137/625.4; 137/896
[58] Field of Search ................. 137/607, 625.3, 625.4, 137/625.39, 890, 895, 896

[56]        References Cited
          U.S. PATENT DOCUMENTS

| 1,307,986 | 6/1919 | Randall et al. | 137/625.39 |
| 2,354,842 | 8/1944 | Spence | 261/116 |
| 3,050,262 | 8/1962 | Curtis | 239/400 |
| 3,220,708 | 11/1965 | Matsui | 261/39.1 |
| 3,318,321 | 5/1967 | Odendahl | 137/117 |
| 3,331,590 | 7/1967 | Battenfeld et al. | 261/50.1 |
| 3,648,714 | 3/1972 | Laveau | 137/890 |
| 3,735,778 | 5/1973 | Garnier | 137/896 |
| 4,128,109 | 12/1978 | Chervenak et al. | 137/375 |
| 4,383,553 | 5/1983 | Platt | 137/625.4 |
| 4,413,646 | 11/1983 | Platt et al. | 137/240 |
| 4,671,321 | 6/1987 | Paetzel et al. | 137/625.3 |
| 4,718,456 | 1/1988 | Schoonover | 137/625.4 |

OTHER PUBLICATIONS

"SteamForm" Conditioning Valves, Yarway Corporation, 1981.
"Copes-Vulcan", SA-35 Steam Atomizing Desuperheater, White Consolidated Industries (1977).

*Primary Examiner*—Stephen M. Hepperle
*Assistant Examiner*—L. R. Leo
*Attorney, Agent, or Firm*—Ferrill and Logan

[57] ABSTRACT

A conditioning valve for simultaneously reducing the pressure and temperature of steam. The invention comprises a valve body divided into first and second chambers, the first chamber having an inlet port for the introduction of superheated steam under high pressure into said conditioning valve and the second chamber having an outlet port for expelling desuperheated and depressurized steam out of said conditioning valve; an annular seat affixed to the interior of said valve between said first and second chambers; a hollow cylindrical cage slidably coupled with said seat, said cage permitting the flow of steam between said first and second chambers when said cage is in a first position and preventing said flow of steam when said cage is in a second position; and water stem means coupled to said cage for adjusting said cage between said first and second positions, said stem means having an outlet for injecting desuperheating water into said second chamber to be mixed with said steam.

2 Claims, 10 Drawing Sheets

CONDITIONING VALVE

FIELD OF THE INVENTION

The present invention is directed to an improved conditioning valve for the simultaneous reduction of both steam temperature and pressure. In particular, the present invention is directed to a steam conditioning valve which incorporates one of a plurality of novel nozzle configurations.

BACKGROUND OF THE INVENTION

The present invention is directed to an improved conditioning valve. Conditioning valves have been developed to simultaneously reduce steam heat and pressure. Conditioning valves eliminate the need for conventional pressure reducing valves and desuperheaters and their separate temperature and pressure measurement-control loops. Typically, conditioning valves are utilized for precise temperature and pressure control in turbine by-pass, drying rolls, air preheater coils, unit tie lines, process reactors, fan drives, compressor drives, plant heating, fuel oil heating, evaporator supply, and atomizing steam.

Steam conditioning valves operate by mixing superheated steam under high pressure with desuperheated steam or atomized water. A problem encountered with prior art valves was that they were complex and difficult to control. An additional problem encountered with prior art conditioning valves was that conditioning occurred in proximity to the valve member. Such conditioning valves required complex structures to provide desuperheating steam or water directly into the valve member, and often failed to achieve uniform distribution of the atomized water or desuperheated steam. Moreover, the greatest area of turbulence often occurs on the outlet side of the valve, downstream of the valve member.

The present invention is directed to a conditioning valve having a smoothly shaped valve housing specifically designed to minimize thermal stresses and fatigue as well as to improve flow characteristics. The smooth flow path shaping avoids flow separation and undesirable vortex streets and therefore maintains a low sound pressure level. The invention incorporates an integral water proportioning system which supplies desuperheating water and which is designed to provide a fixed water to steam flow ratio proportional to the plug position which is a function of the valve stroke. The valve of the present invention is able to respond to large changes in load while maintaining precise temperature control.

The present invention further incorporates novel injection nozzles which uniformly distribute the water within the high turbulence area. The features provided by the nozzles of the present invention assure complete atomization, and thereby optimize evaporation and temperature control. Noise reduction is enhanced by injecting water into the area of highest turbulence.

SUMMARY OF THE INVENTION

In accordance with the present invention, a conditioning valve for simultaneously reducing the pressure and temperature of incoming steam is disclosed. The invention comprises a valve body divided into first and second chambers, the first chamber having an inlet port for introducing superheated steam under high pressure into the conditioning valve, the second chamber having an outlet port for expelling conditioned steam (and water) out of the conditioning valve. An annular seat is affixed to the interior of the valve body between the first and second chambers. A perforated cylindrical outer casing is affixed to the annular seat and extends into the second chamber. The outer casing permits the flow of steam into the second chamber. Cylindrical valve means is slidably matable within the annular seat and the outer casing, the cylindrical valve means extending between the first and second chambers, the cylindrical valve means having a plurality of openings over a portion of its body to permit the flow of steam between said first and second chambers when the cylindrical valve means is in a first position, the openings being closed off from the flow of steam when the cylindrical valve means is in a second position. A water stem extends axially through the center of the cylindrical valve means and outer casing and terminates in the second chamber, the water stem transporting desuperheating water to the second chamber, the stem further being coupled to the cylindrical valve means and slidably adjusting the cylindrical valve means between the first and second positions. Finally, means located at the terminal end of the water stem injects atomized desuperheating water into the second chamber to be mixed with steam entering the second chamber.

BRIEF DESCRIPTION OF THE DRAWINGS

The foregoing summary, as well as the following detailed description will be better understood when read in conjunction with the figures appended hereto. For the purpose of illustrating the invention, there is shown in the drawings an embodiment which is presently preferred, it being understood, however, that this invention is not limited to the precise arrangement and instrumentalities shown.

FIG. 9C is a planar view of the fourth alternative nozzle embodiment along line C—C of FIG. 9.

DETAILED DESCRIPTION OF THE PREFERRED EMBODIMENT

Figure 1:
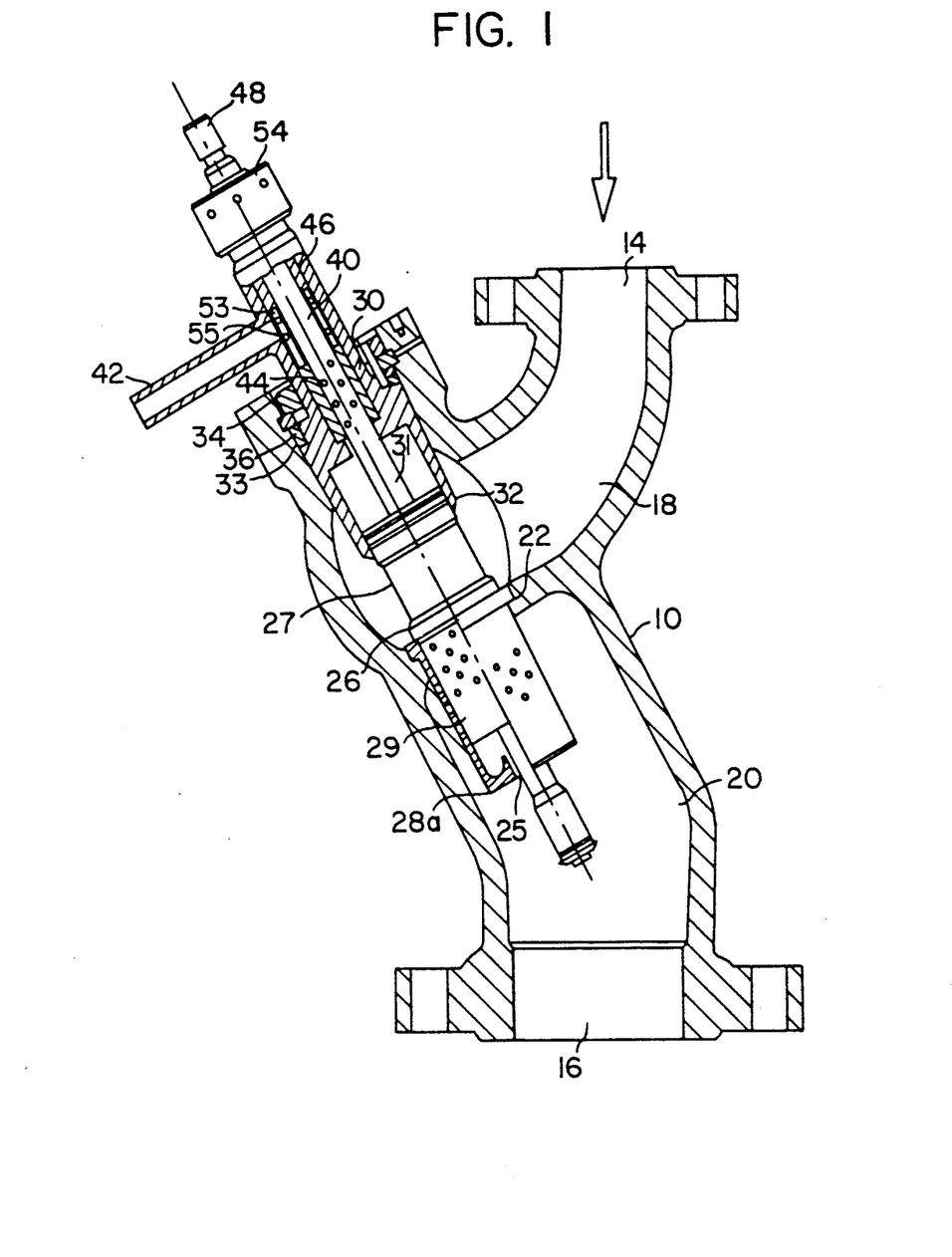
FIG. 1 is a section view of the conditioning valve of the preferred embodiment.

The present invention is described with reference to the enclosed figures, wherein the same numbers are used where applicable. Referring to FIG. 1, an elevated section view of the conditioning valve of the preferred embodiment is shown. Valve 10 comprises a body 12 which has had an inlet port 14 for the injection of superheated steam and an outlet port 16 which expels desuperheated steam (and water). The casing therefore comprises an inlet chamber 18 and an outlet chamber 20. The chambers are divided by an annular seat 22 formed along an inwardly extending wall in the housing.

The seat assembly supports two concentric perforated cylindrical cages. The inner cylindrical cage 26 is divided into an upper solid portion 27 which functions as the plug and a perforated lower portion 29 through which superheated steam flows from the inlet chamber. The outer cylindrical cage 28 extends into outlet chamber 20 and is superimposed over the inner cylindrical cage 26. Outer cylindrical cage 28 also contains perforations through which desuperheated steam enters the outlet chamber 20. Outer cylindrical cage 28 mates with annular seat 22 and is arced inward 28a to break standing waves. Both cages and the seat assembly function as a valve to control the flow of steam between the inlet and outlet chambers.

The valve housing has another opening 33 which supports a bonnet 30 and water stem assembly 31. The inner cylindrical cage 26 slides within bonnet 30. Piston rings 32 surround plug 27 and maintain a seal. The bonnet 30 is maintained within the housing by segment ring 34 and pressure seal gasket 36. Prestress ring 38 further supports bonnet 30.

A water stem 40 extends through the center of bonnet 30, axially through the interior of cylindrical cages, and into the outlet chamber 20. The water stem 40 contains at its upper end holes 44 which slidingly align with a water inlet conduit 42. Water stem 40 extends through opening 33 in the valve housing, and is sealed at its upper end through packing 46. Water stem 40 and plug 27 are slidably adjustable within the bonnet 30 by means of stem and plug assembly 48 i.e. by moving 48 up and down. A retaining ring 54 holds a gland (not shown) against the packing nut (not shown). The stem and plug assembly 48 can be moved longitudinally by any conventional mechanical device. A perforated sleeve 53 surrounds the water stem at the upper end. Perforations 55 are adjacent to the upper end of water stem 40 and permit water to flow from the water conduit into the holes 44 in water stem 40.

Figure 2:
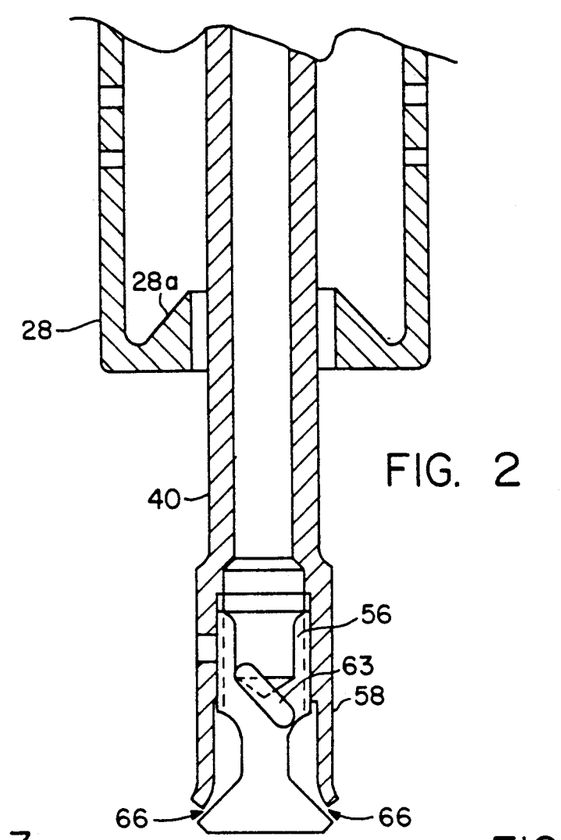
FIG. 2 is an enhanced section view of the water stem and outlet of the preferred embodiment.

The water outlet nozzle of the first embodiment is now described with reference to FIGS. 2, 3 and 4. Referring to FIG. 2, the lower most portion of the water stem 40 extending through cylindrical cages 26 and 28 is shown. The water stem has an outlet which comprises a nozzle 56 which is retained within the outer sleeve 58 which is integral with stem 40 and located at the lowermost portion of the stem 40. Nozzle 56 comprises a sequence of outwardly extending outlet conduits 62 which are beveled downward and which direct jets of water outward against the interior wall of the sleeve 58. Cooling water exits an annular channel 66 formed between the nozzle 56 and the sleeve 58.

Figure 5:
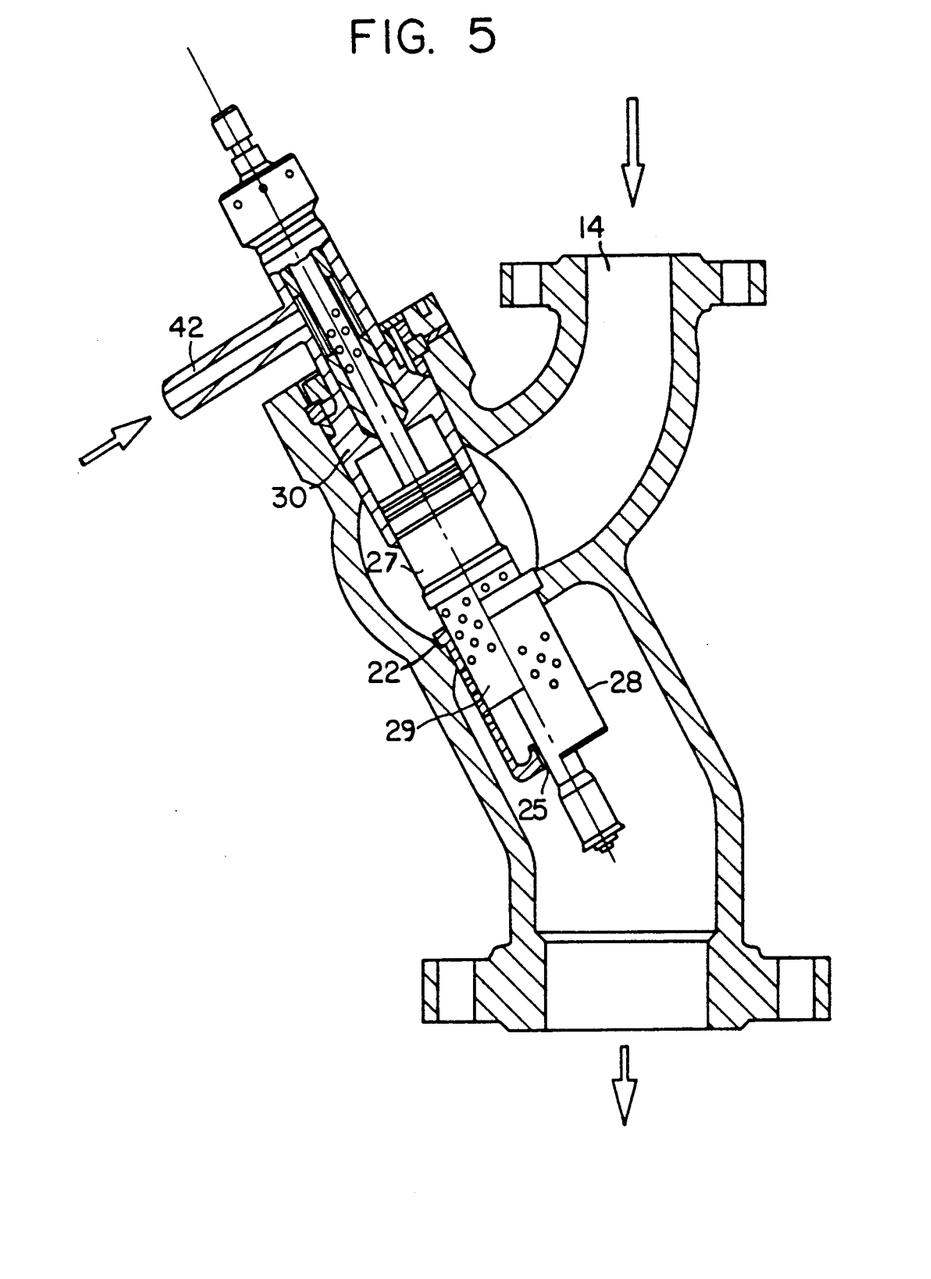
FIGS. 5 is a section view of the conditioning valve of the preferred embodiment during operation.

The operation of the present invention is now described with reference to FIGS. 1 and 5. Referring to FIG. 5, the conditioning valve of the present invention is shown in the open position. Stem and plug assembly 48 is pulled upward. This pulls valve stem 40 and inner cage 26 toward bonnet 30. Steam flows into the body 12 through inlet port 14 over seat 22 and through the perforations in inner cage 26 which provides initial pressure reduction. The invention incorporates a small passage 25 between the outer cylinder 28. This creates a suction effect at the nozzle end. The steam then flows through the perforated lower portion 29 and enters the outlet chamber through perforated outer cage 28 which provides a second controlled pressure reduction. Simultaneously, the water holes 44 in the upper portion of the stem assembly 40 are aligned with perforations 55 and water inlet conduit 42. Cooling water is injected down the stem and out the atomizing nozzle 56. The steam and water mix and the temperature is reduced. By gradually moving the stem upward, a precise number of perforations are open in the inner cage 26, and upper stem 40. The amount of desuperheating water injected is therefore directly proportional to the amount of steam flowing through the valve.

Because of the unique design of the above described water nozzle and the fluid dynamics of the valve, the atomized water mixes thoroughly with the steam in outlet chamber 20 without impinging on the inner walls of the valve body. The high velocity steam boundary layer along the walls of outlet chamber avoids the formation of a water spray to the wall and avoids water impingement. Steam, reduced in both pressure and temperature, is discharged into the downstream piping fully conditioned, so as not to cause harm to any instrumentation, machinery, valves or elbows.

FIG. 1 discloses the stem and cage plug assembly in the closed position. As shown, the water stem 40 and inner cylindrical cage 26 are pushed downward and the non-perforated portion 29 of the inner cylindrical cage 26 is superimposed over the annular seat 22. The holes in upper water stem are pulled down away from the water inlet conduit and the perforated water sleeve 53. Thus, none of the holes in the inner cage upper stem are exposed to the steam or water flow.

Figure 11:
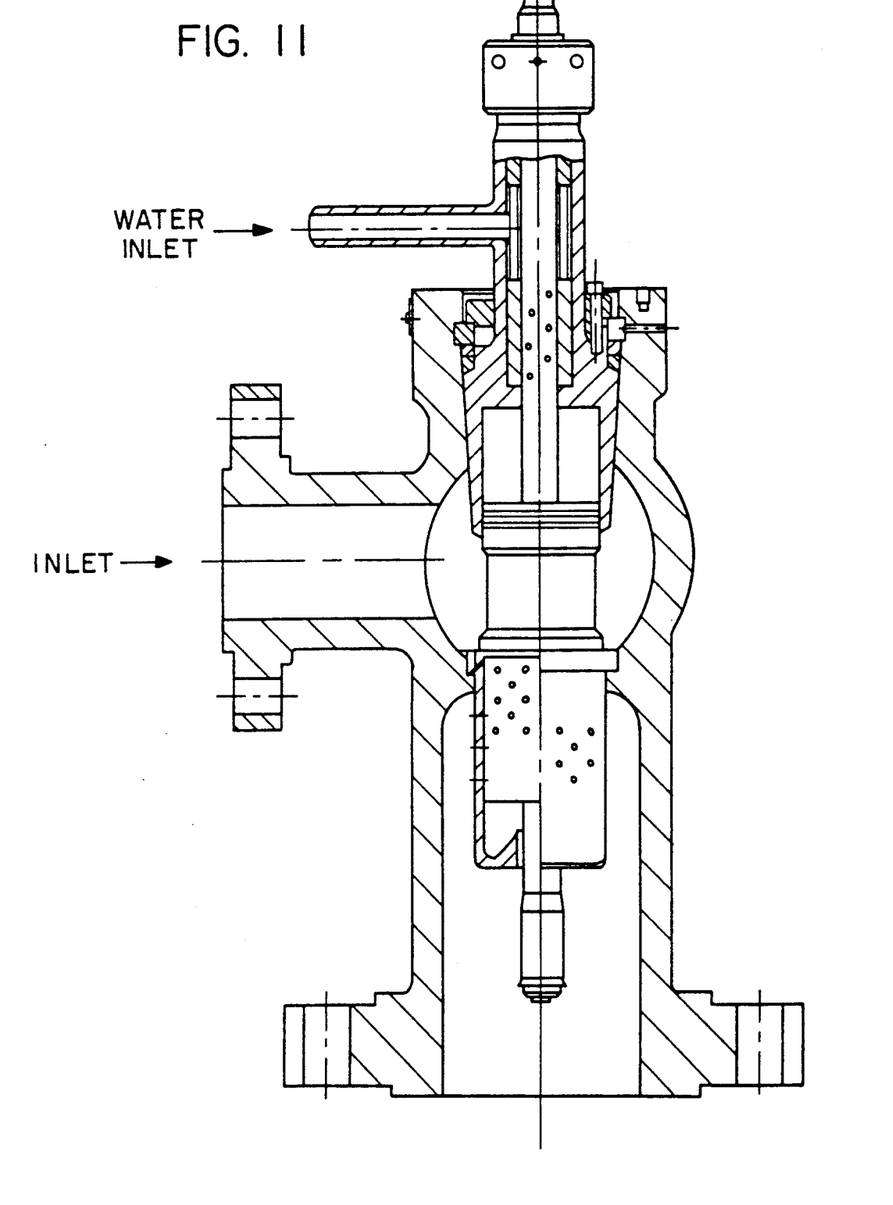
FIG. 11 is a section view of an angled steam conditioning valve with a pressure sealed bonnet.
Figure 12:
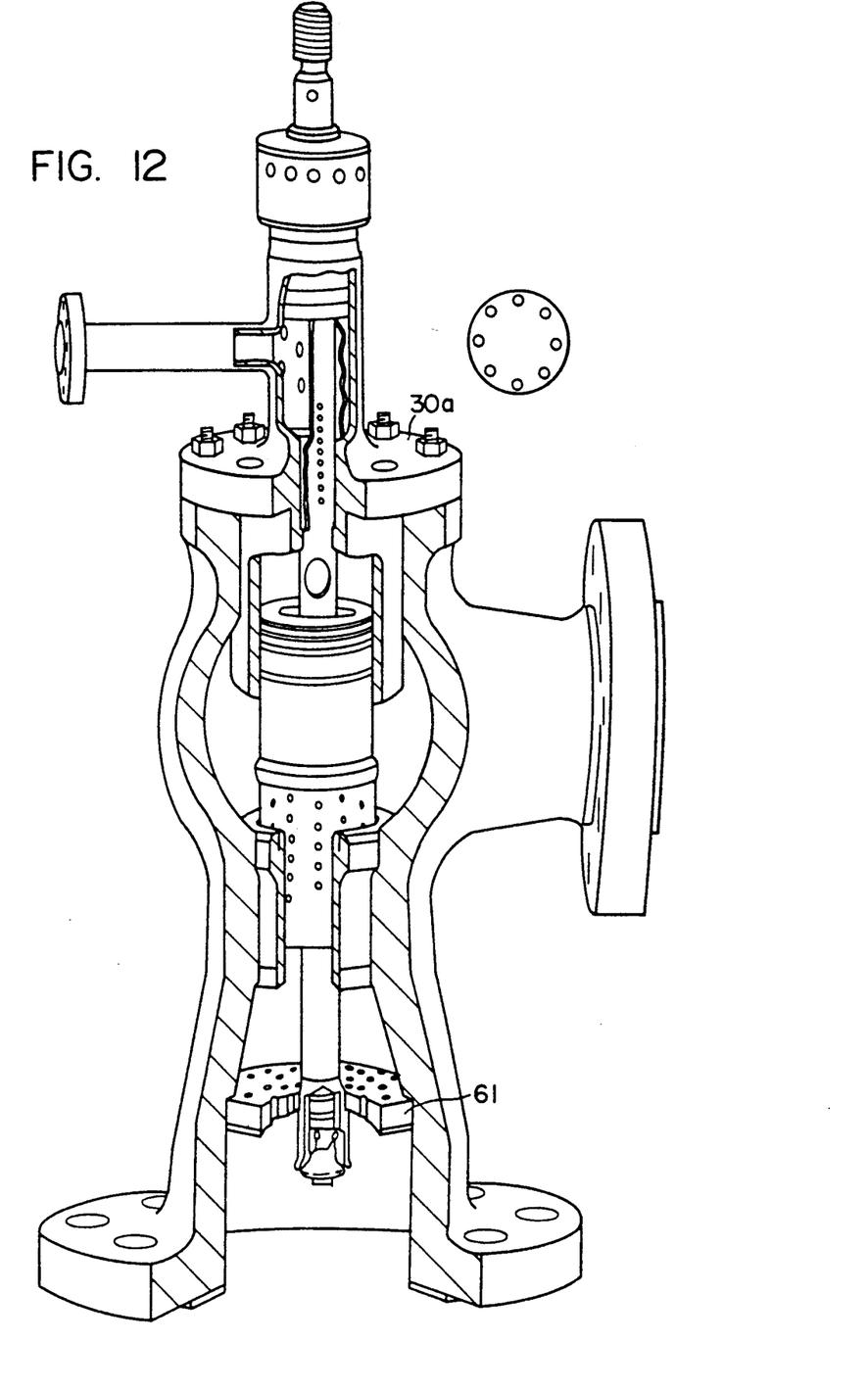
FIG. 12 is a broken away elevated view of an angled steam conditioning valve with a bolted bonnet.

The present invention has been disclosed in the context an in-line valve in which the inlet and outlet ports lie along the same plane of reference. However the benefits of the present invention are equally applicable in an angled valve such as that disclosed in FIGS. 11 and 12. The valve of FIG. 11 incorporates a pressure sealed bonnet. The valve of FIG. 12 incorporates a bolted bonnet 30a and silencer plate 61. Both embodiments operate in an identical manner as that discussed in FIGS. 1-5.

Figure 3:
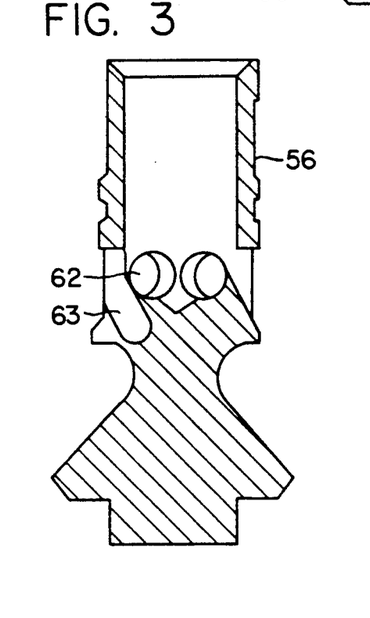
FIGS. 3 and 4 are enhanced section views of the atomizing nozzles of the preferred embodiment.
Figure 4:
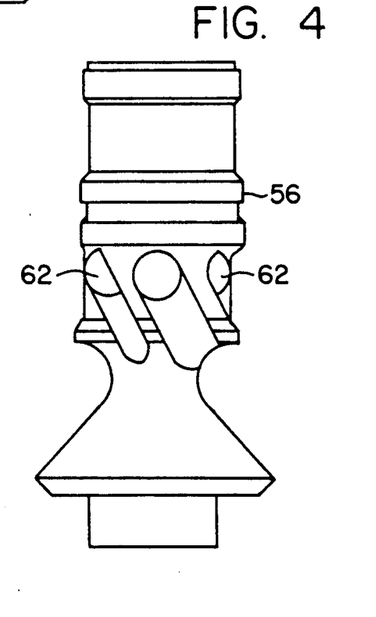
Figure 6:
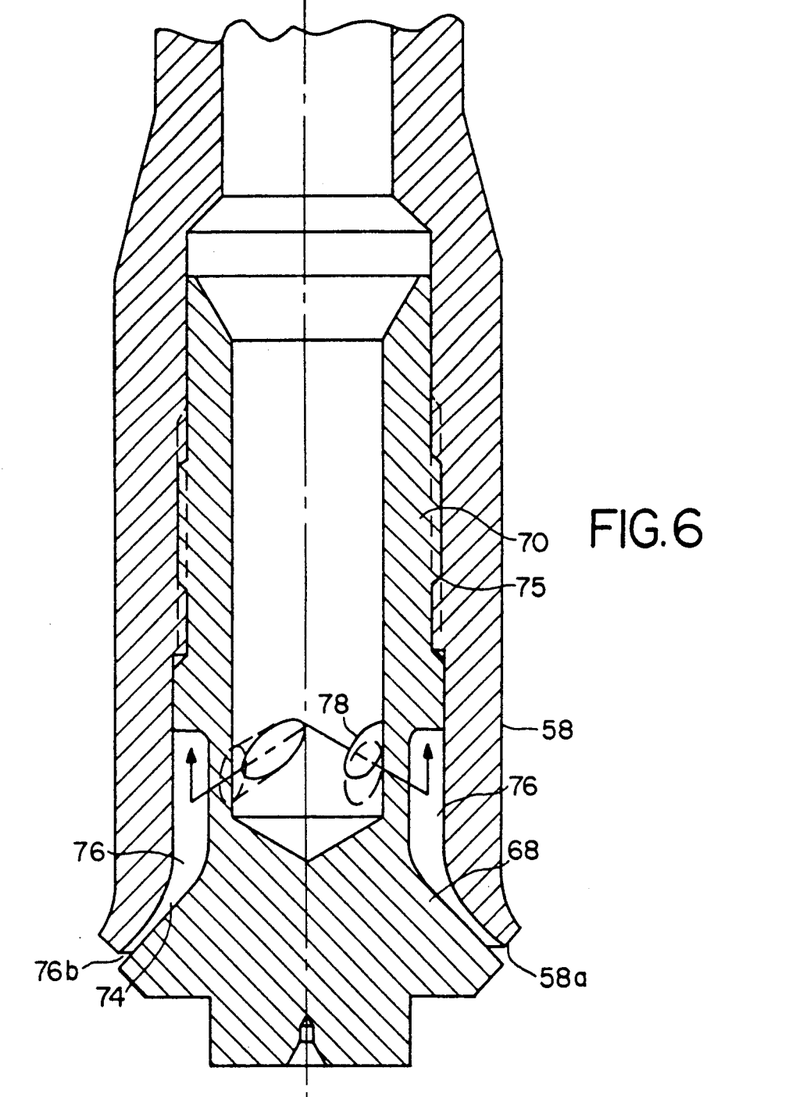
FIG. 6 is a section view of an alternative nozzle embodiment.
Figure 6A:
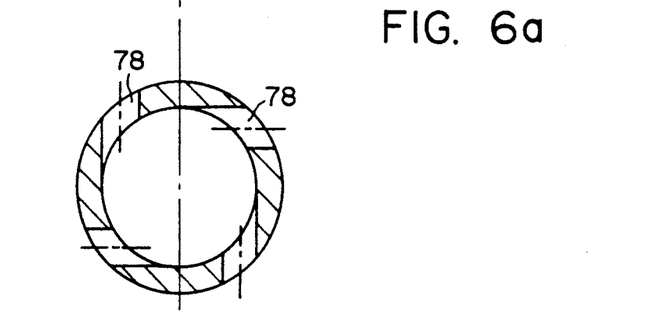
FIG. 6A is a planar view of the alternative nozzle embodiment along line A—A of FIG. 6.

In addition to the nozzle embodiment disclosed above in FIGS. 2-4, the present invention may also be utilized with one of the five alternative nozzle embodiments disclosed in FIGS. 6-10. FIGS. 6 and 6A illustrate a first alternative nozzle embodiment. The nozzle of FIG.

6 comprises a plug 68 which is inserted into the end of the water stem sleeve 58. The plug 68 includes a hollow tubular sleeve 70 which extends into the water stem sleeve 58 and a plug end section 72 located proximate to the outer sleeve 58, and which forms a water flow surface 74. An annular flow channel 76 is thus formed between the outer sleeve of the water stem and the plug end. The tubular sleeve 70 is connected to the inner walls of the water stem by a thread 75 and forms an internal water passage between the water stem and plug end. As shown in the plan view of FIG. 6A, the tubular sleeve contains multiple downwardly extending tangential conduits 78 located near the plug end. The conduits connect the inside of the sleeve 70 with the annular channel 76.

The water flows down the water stem and enters the inside channel formed by tubular sleeve 70. The water then enters the tangentially extending conduits 78 where it is radially and tangentially accelerated into channel 76, imparting a high velocity swirling motion. During low water flow conditions, the water does not completely fill channel 76, but attaches to the inner wall of 58, and is discharged across the outer lip 58a. As flow increases, water accelerates through channel 76 and discharges across the controlled opening 76b.

Figures 7, 7A, 7B:
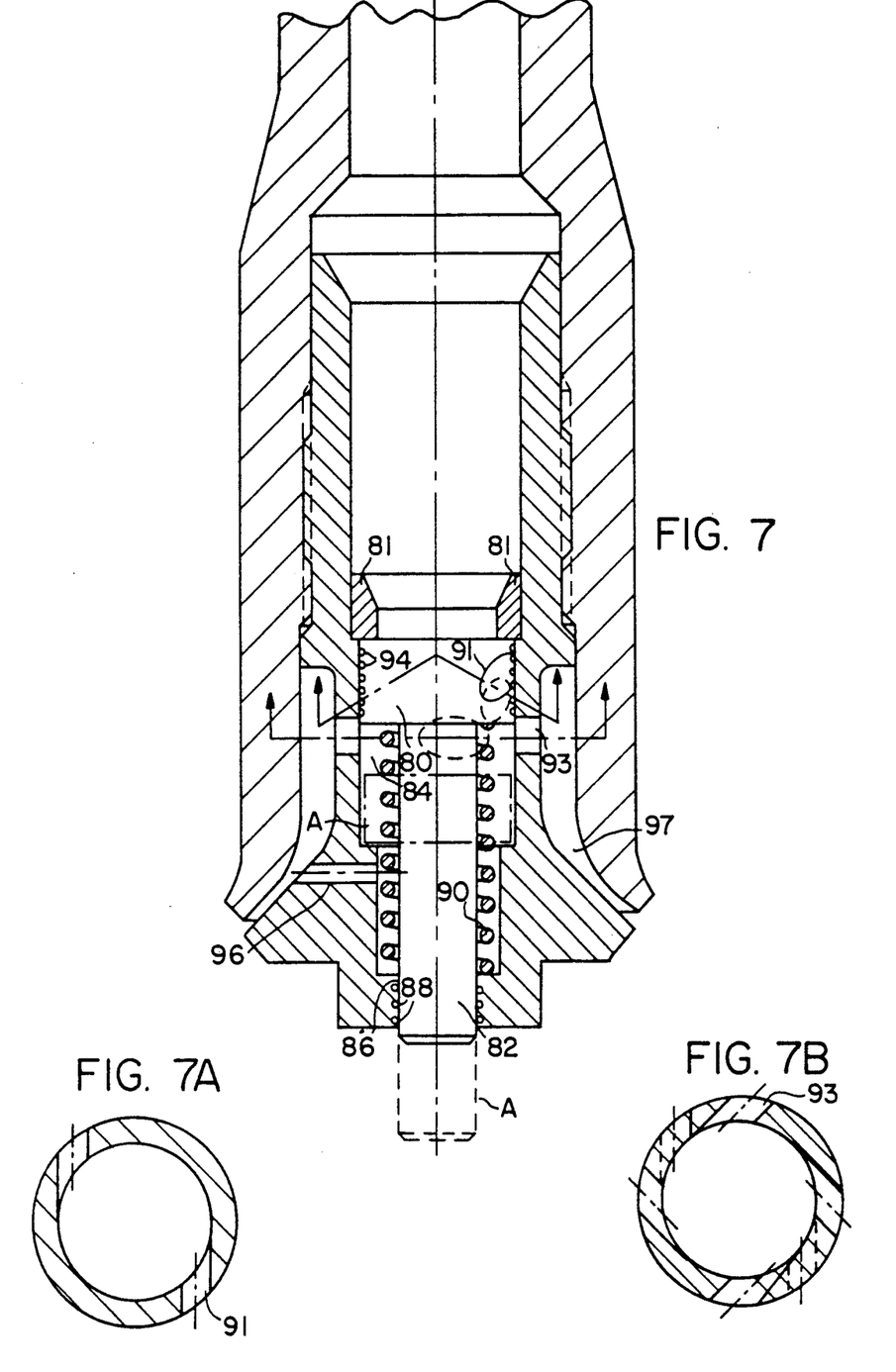
FIG. 7 is a section view of a second alternative nozzle for the preferred embodiment.
FIG. 7A is a plan view of the second alternative nozzle along line A—A of FIG. 7.
FIG. 7B is a plan view of the second alternative 2, embodiment along line B—B of FIG. 7.

FIGS. 7-7B illustrate a second alternative nozzle embodiment. As with the embodiment in FIGS. 6 and 6A, the embodiment of these Figures similarly utilize a plug which is inserted into the water stem. The plug contains an interior hollow sleeve 79 which mates with the water stem but narrows and terminates at a side wall defining a seat 81. A spring activated piston 80 and rod 82 arrangement operate create a back pressure to control the flow of water out of the water stem. The piston 80 and rod 82 are slidably retained within a cylindrical piston chamber 84 which is bored into the plug end. The plug end further contains a bore 86 which facilitates the longitudinal movement of the rod out of the plug end and into outlet chamber 20. The bore 86 contains a labyrinth 88 which catches dirt and reduces leakage. The piston valve is biased upward by a spring 90 housed within the cylindrical piston chamber 84 and lies flush against seat 81 of a water channel contained within the water stem, thereby preventing water flow.

During operation, as water pressure in the water stem builds, the biased piston valve 80 is thrust downward into the cylindrical piston chamber and away from the seat 81 (see hashed lines A). As the piston valve is thrust downward by the water pressure, it sequentially exposes ducts 91 and a plurality of tangential channels 93 (FIGS. 7A and 7B) bored longitudinally into the walls of the plug. The sides walls of the piston valve also contain a labyrinth 94 to reduce leakage and catch dirt. As the downward thrust of the piston valve 80 continues, desuperheating water exits sequentially out the ducts 91 and if the water pressure from the valve stem is high enough, out the tangential flow channels 93 and into the annular channel 97 formed between the plug end and the water stem. The plug end further contains a narrow horizontal conduit 96 extending between the piston chamber and annular channel to permit excess water trapped within cylindrical piston chamber 84 to exit the system.

In both the embodiments of FIGS. 6 and 7, then, a swirling pattern is used in combination with an annular channel. The swirl pattern is developed by tangential orifices discharging the water from an interior plug chamber onto the inside of the water stem sleeve 58. At low to intermediate flow conditions, the radial velocity component developed by the change in direction of the fluid, causes the fluid to flow along the inside surface of the water tube and discharge off the outer discharge edge in a uniform pattern. At higher flows, the annular gap becomes the restriction. A spray pattern is accordingly developed by a combination of the swirl velocity and the acceleration through the annular orifice.

Figure 8:
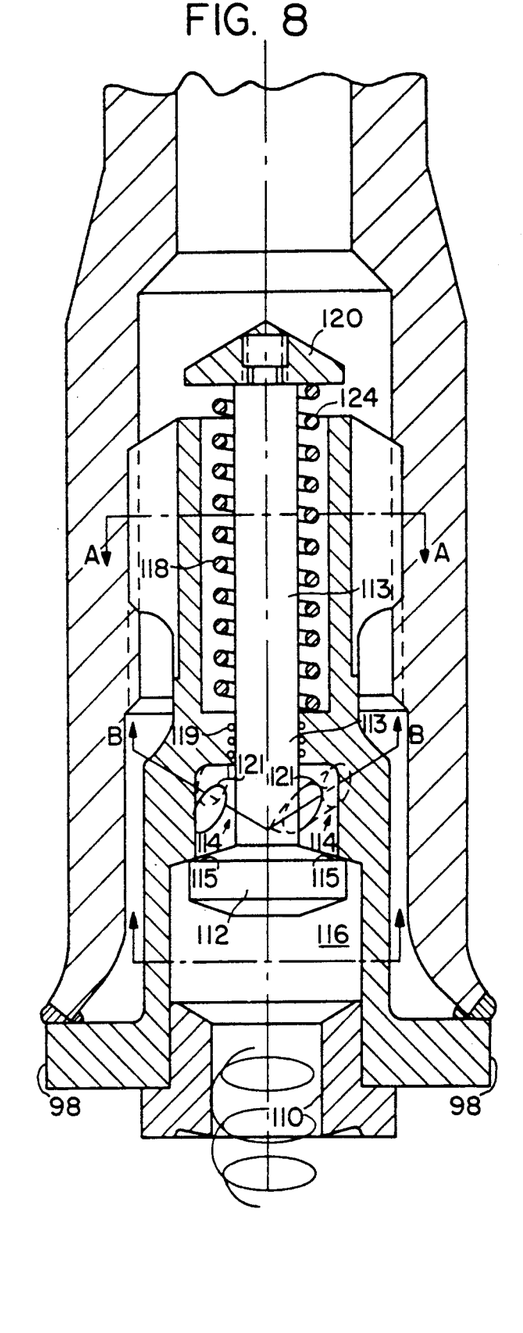
FIG. 8 is a section view of a fourth alternative atomizing nozzle.
Figure 8A:
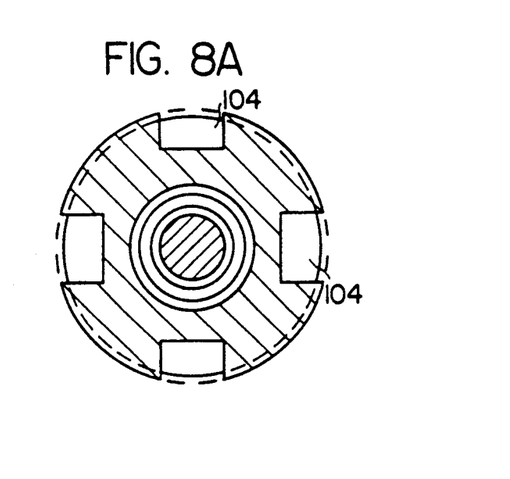
FIG. 8A is a planar view of the fourth alternative nozzle embodiment along line A—A of FIG. 8.
Figure 9:
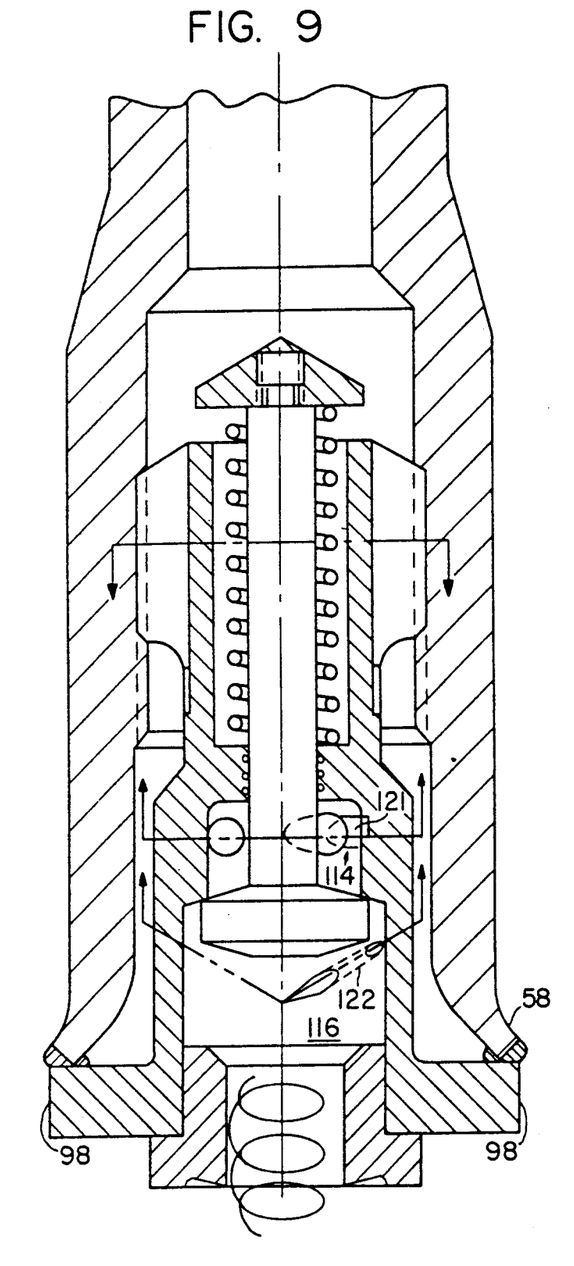
FIG. 9 is a fifth embodiment for the nozzle for the preferred embodiment.
Figure 9A:
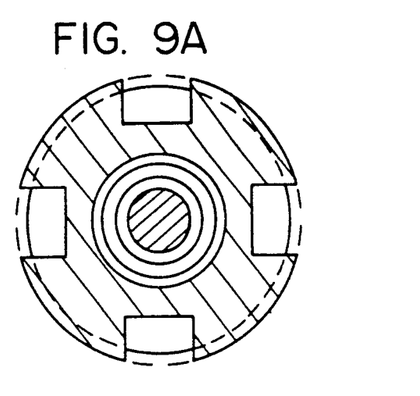
FIG. 9A is a plan view of the fifth alternative nozzle along line A—A of FIG. 9.
Figure 9B:
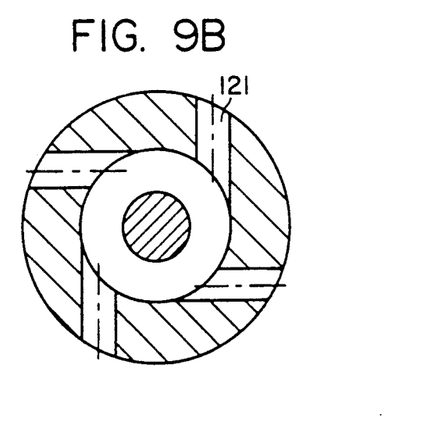
FIG. 9B is a plan view of the fifth alternative nozzle along B—B of FIG. 9.
Figures 10, 10A, 10B:
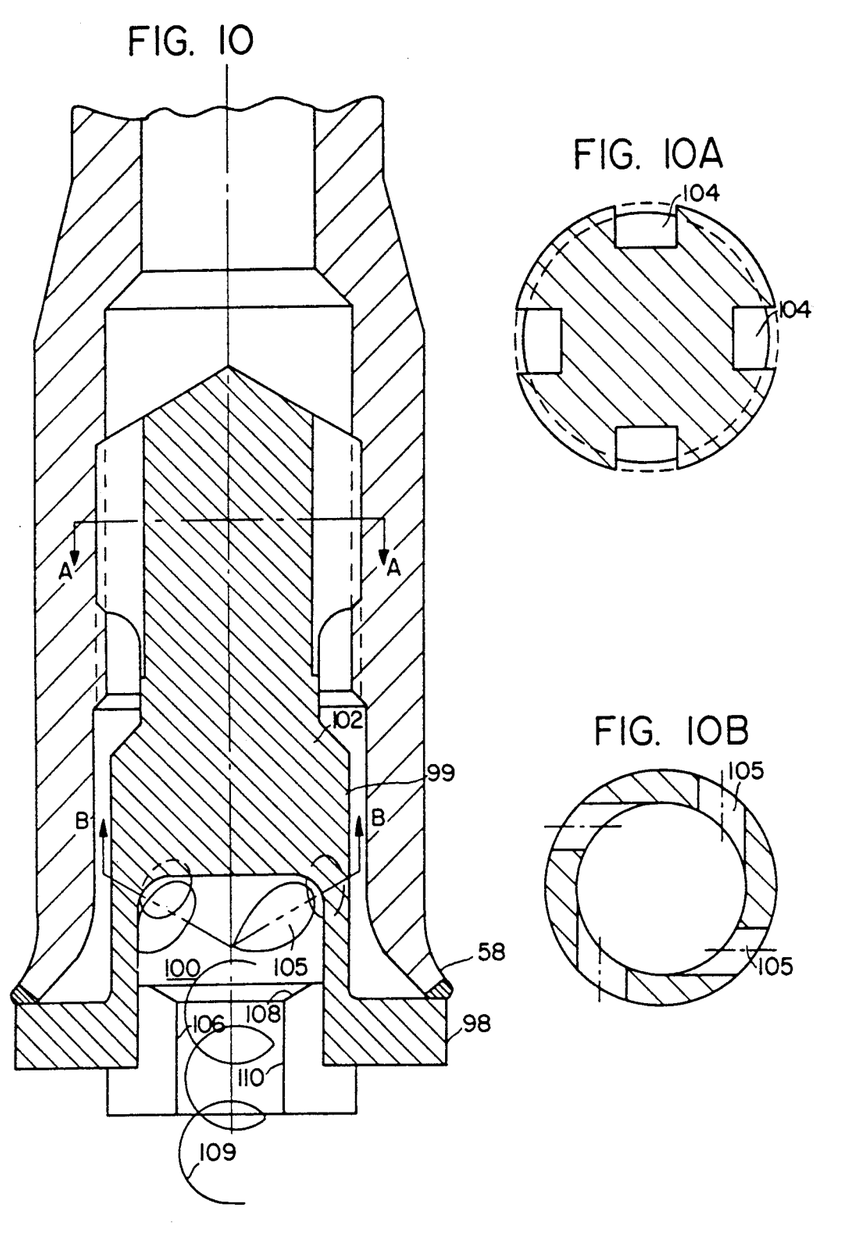
FIG. 10 is a section view of a third alternative nozzle for the preferred embodiment.
FIG. 10A is a planar view of the third alternative nozzle embodiment of FIG. 10.
FIG. 10B is a section view of the third alternative nozzle embodiment along line B—B of FIG. 10.

Three additional nozzle configurations are disclosed in FIGS. 8, 9, and 10. In each of these embodiments, a vortex nozzle is utilized. FIG. 10 illustrates a vortex nozzle with tangential angular feed ports. In this embodiment and in the embodiments of FIGS. 8 and 9, the nozzle plug 99 is inserted into the water stem. The nozzle plug 99 contains an annular lip 98 which attaches to and seals off the terminal end of the water stem. The plug comprises a cavity portion 100 and a solid body 102 which extends up into the water stem. The solid body portion contains flow channels 104 located on its outer periphery. Tangential conduits 105 connect the flow channels 104 to the top of the cavity 100. A nozzle piece 106 is attached to the end of plug. The nozzle piece 106 comprises a beveled inlet 108 and a hollow cylindrical opening 110.

During operation, water descends down the water stem. When the water flow reaches the solid body 102 it is directed toward the four rectangular flow channels 104. The water flows down the channels 104 and into the tangential conduits 105. The tangential conduits 105 create a swirling vortex 109 of water within the cavity which exits through the hollow cylindrical opening 110 of the nozzle.

Figure 8B:
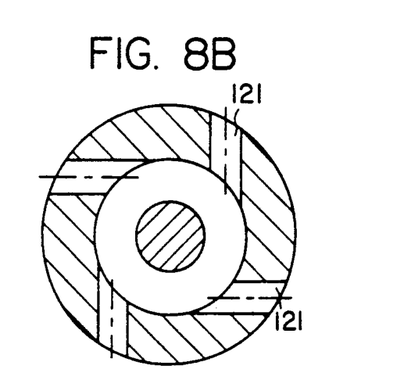
FIG. 8B is a planar view of the fourth alternative nozzle embodiment along line B—B of FIG. 8.
Figure 8C:
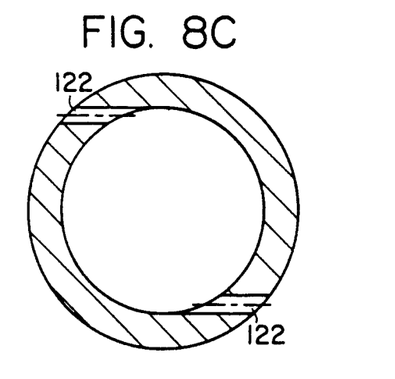

FIGS. 8-8B illustrate a similar nozzle to that disclosed in FIG. 10. In FIG. 8, the end plug and nozzle are attached in an identical manner to that of the embodiment in FIG. 10. This embodiment utilizes a spring activated piston valve 112 and valve seat 115 which separates respective upper and lower flow chambers 114, 116. The piston valve and has a rod 113 which extends up into the water stem and is enclosed within a hollowed sleeve section which defines a piston chamber 118. The rod 113 is coupled to a dome shaped end piece 120 which is biased upward against the valve seat 115 by a biasing spring 124 situated within the hollowed piston chamber 118. The rod is further guided by guiding walls which extend from the upper walls of the upper chamber. The guides contain a labyrinth 119 to catch dirt and minimize leakage between the piston chamber 118 and upper flow chamber 114. The piston shaped valve member is attached to the other end of the rod and separates the upper and lower chambers. The upper chamber is thus defined between the walls of the end plug, the guides and the piston. The lower chamber is situated between the piston valve and the nozzle. Four tangential conduits 121 connect the upper chamber with channels 104.

During operation, water flows down the water stem and is directed by the dome-shaped end piece 120 into the four rectangular flow channels 104. The water then flows into the tangential conduits 121 and enters the upper chamber 114 as a swirling vortex. As the water pressure in the upper chamber builds, the biased valve member is thrust downward thereby permitting water to exit the upper chamber as a swirling vortex and enter the lower chamber 116. The water then exits through nozzle 110. This valve prevents flashing in the water stem.

FIGS. 9-9C illustrate a two stage spring loaded vortex nozzle. This embodiment is identical to that disclosed above in FIG. 8 except that it incorporates additional tangential conduits 122 in lower chamber 116. The embodiment of FIG. 7 therefore provides a constant linkage between the rectangular flow channels 104 and the lower chamber 116. During periods of low water flow, there is a constant vortex of water through the nozzle via tangential conduits 122. As the pressure builds in the upper chamber the piston valve is thrust downward off the valve seat, additional flow between the upper and lower chambers occurs. This embodiment thus creates a two stage injector valve.

The spray patterns of the vortex nozzles of FIGS. 8, 9 and 10 are controlled by the design proportions of the nozzle and orifice, the radial acceleration developed by the tangential inlet ports and the exit configurations. Vortex nozzles are tolerant of dirt and particulate matter due to their large orifices. The maximum flow capacity is less than can be accomplished in a swirl nozzle of the same size.

It will be recognized by those skilled in the art that changes may be made to the above-described embodiments of the invention without departing from the broad inventive concepts thereof. It is understood, therefore, that this invention is not limited to the particular embodiments disclosed, but it is intended to cover all modifications which are within the scope and spirit of the invention as defined by the claims appended hereto.

What is claimed is:

1. A conditioning valve for simultaneously reducing the pressure and temperature of incoming steam comprising:

a valve body having an interior divided into first and second chambers, said first chamber having an inlet port for introducing superheated steam flow under high pressure into said conditioning valve, said second chamber having an outlet port for expelling conditioned steam out of said conditioning valve;

an annular seat affixed to the interior of said valve body between said first and second chambers;

a perforated cylindrical outer casing affixed to said annular seat and extending into said second chamber, said outer casing permitting the flow of steam into said second chamber;

retractable cylindrical valve means slidably matable within said annular seat and said perforated cylindrical outer casing, said cylindrical valve means extending between said first and second chambers, said cylindrical valve means having a plurality of openings over a portion of its body to permit the flow of steam between said first and second chambers when said valve means is in a first position, said openings being closed off from said flow of steam when said cylindrical valve means is in a second position;

a water steam extending axially through the center of said cylindrical valve means and said outer casing, said water steam having a terminal end in said second chamber, said water steam transporting desuperheating water to said second chamber, said stem further being coupled to said cylindrical valve means and slidably adjusting said cylindrical value means between said first and second positions; and means located at the terminal end of said water stem for injecting atomizing water into said second chamber to be mixed with steam entering said second chamber.

2. A conditioning valve for simultaneously reducing the pressure and temperature of incoming steam comprising:

a valve body having an interior divided into first and second chambers, said first chamber having an inlet port for introducing a flow of superheated steam under high pressure into said condition valve, said second chamber having an outlet port for expelling conditioned steam out of said conditioning valve;

an annular seat affixed to the interior of said valve body between said first and second chambers;

a perforated cylindrical outer casing affixed to said annular seat and extending into said second chamber, said outer casing permitting the flow of steam into said second chamber;

retractable cylindrical valve means slidably matable within said annular seat and said perforated cylindrical outer casing and extending between said first and second chambers, said cylindrical valve means having a plurality of perforations over a portion of its body to permit the flow of steam between said first and second chambers when the cylindrical valve means is in a first position, said perforations being closed off from said flow of steam when said cylindrical valve means is in a second position;

a water steam extending through said cylindrical valve means, said water steam having a terminal end within said second chamber for transporting desuperheating water to said second chamber, said stem being coupled to said cylindrical valve means and slidably adjusting said cylindrical valve means between said first and second positions; and nozzle means located at the terminal end of said water stem for injecting atomized desuperheating water into said second chamber to be mixed with steam entering said second chamber, said nozzle means comprising a tubular sleeve coupled with an angled plug end, said tubular sleeve being inserted into said terminal end of said water stem and mating therewith so as to form a flow path between said water stem and said plug end, said plug end and said terminal end forming an annular flow channel, said tubular sleeve having a plurality of tangential openings adjacent to said plug end so as to generate a swirling stream of water which exits out said annular channel into said second chamber.

* * * * *

UNITED STATES PATENT AND TRADEMARK OFFICE
CERTIFICATE OF CORRECTION

PATENT NO. : 5,005,605

DATED : April 9, 1991

INVENTOR(S) : Max Kueffer and Roy L. Feiss

It is certified that error appears in the above-identified patent and that said Letters Patent is hereby corrected as shown below:

Col. 2, end of line 60, "Fig. 8B" should begin a new paragraph.

Col. 4, line 39, after "chamber" insert --20--.

Col. 5, line 33, after "arrangement" delete --operate--.

Col. 8, line 1, "steam" should be --stem--.

Col. 8, line 3, "steam" should be --stem--.

Col. 8, line 4, "steam" should be --stem--.

Col. 8, line 19, "condition" should be --conditioning--.

Col. 8, line 38, "steam" should be --stem--.

UNITED STATES PATENT AND TRADEMARK OFFICE
CERTIFICATE OF CORRECTION

PATENT NO. : 5,005,605

DATED : April 9, 1991

INVENTOR(S) : Max Kueffer and Roy L. Feiss

It is certified that error appears in the above-identified patent and that said Letters Patent is hereby corrected as shown below:

Col. 8, line 39, "Steam" should be --stem--.

Signed and Sealed this

Eighth Day of September, 1992

Attest:

DOUGLAS B. COMER

Attesting Officer

Acting Commissioner of Patents and Trademarks